US012211658B2

(12) United States Patent
Gray

(10) Patent No.: US 12,211,658 B2
(45) Date of Patent: Jan. 28, 2025

(54) AUDIO KEYBOARD BUTTON WITH VARYING OUTPUT

(71) Applicant: Focusrite Audio Engineering Limited, High Wycombe (GB)

(72) Inventor: Ryan Gray, Hazlemere (GB)

(73) Assignee: Focusrite Audio Engineering Limited, High Wycombe (GB)

( * ) Notice: Subject to any disclaimer, the term of this patent is extended or adjusted under 35 U.S.C. 154(b) by 105 days.

(21) Appl. No.: 17/768,533

(22) PCT Filed: Oct. 9, 2020

(86) PCT No.: PCT/GB2020/052507
§ 371 (c)(1),
(2) Date: Apr. 13, 2022

(87) PCT Pub. No.: WO2021/074596
PCT Pub. Date: Apr. 22, 2021

(65) Prior Publication Data

US 2023/0245842 A1 Aug. 3, 2023

(30) Foreign Application Priority Data

Oct. 14, 2019 (GB) ...................................... 1914836

(51) Int. Cl.
*H01H 13/705* (2006.01)
*H01H 13/84* (2006.01)

(52) U.S. Cl.
CPC .......... *H01H 13/705* (2013.01); *H01H 13/84* (2013.01); *H01H 2203/02* (2013.01); *H01H 2239/078* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS 5,536,911 A * 7/1996 Madill ................ H01H 25/041
200/6 A
7,030,329 B1 * 4/2006 Sneek .................... H01H 13/79
200/292

(Continued)

FOREIGN PATENT DOCUMENTS

EP 1058177 A1 12/2000

OTHER PUBLICATIONS

Combined Search and Examination Report mailed Apr. 14, 2020; priority application GB 1914836; Intellectual Property Office of Great Britain.

(Continued)

*Primary Examiner* — Ahmed M Saeed
(74) *Attorney, Agent, or Firm* — Innovation Law Office; Dennis S. Schell

(57) ABSTRACT

There is provided a button for varying output based on force applied. The button comprises: a contact pad with at least two contacts, the contacts being arranged in a complementary pattern of interdigitated fingers with a separation therebetween; and an actuator and a conductive layer, the conductive layer being located between a base of the actuator and the contact pad and being independent of the actuator and contact pad, the base of the actuator being shaped to increase the surface area of the conductive layer in contact with the contacts as the actuator is pushed towards the contact pad. This increases current flow between the contacts in use as the force applied to the actuator increases.

19 Claims, 5 Drawing Sheets

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 11,219,126 | B2 * | 1/2022 | Okamura | H01H 1/06 |
| 2001/0008848 | A1 | 7/2001 | Armstrong | |
| 2004/0130528 | A1 | 7/2004 | Baker | |
| 2004/0231969 | A1 * | 11/2004 | Kitano | G01L 1/20 200/511 |
| 2007/0278082 | A1 | 12/2007 | Parkinson | |

OTHER PUBLICATIONS

International Search Report mailed Dec. 14, 2020; priority application PCT/GB2020/052507; International Searching Authority/EPO; Authorized officer Kellner, Alexandra.

* cited by examiner

AUDIO KEYBOARD BUTTON WITH VARYING OUTPUT

FIELD OF THE INVENTION

The present invention relates to a button and button array. The button and button array are typically used as part of a music controller to vary output based on force applied to a respective button.

BACKGROUND

Velocity pads and velocity sensitive buttons are used in a number of applications. This includes using products where identifying, recording or tracking the velocity at which a button is pressed or the force applied to the button pad is important.

One industry that is increasingly using velocity pads is the musical instrument industry. This is because music production is expanding to include digitised instruments that are able to replicate multiple different instruments within a single unit as well as allowing control, processing and production of music through the same unit.

These musical instruments generally include multiple buttons, each of which is a velocity pad or velocity sensitive button that can either sense the velocity at which the button is pushed or can detect the force with which the button is pushed. Such instruments also often include a number of other features such as a keyboard and/or faders.

When force is to be detected, the internal structure of the button typically uses a force sensing resistor (FSR). However, the standard configuration of buttons using an FSR has been found to be unsatisfactory. This is for multiple reasons, including poor sensitivity where the button is not triggered when only touched lightly, which can limit the playing style or usability by a user; small dynamic range, where the signal produced by pressing the button will increase from minimum to maximum value over only a small range of force increase, which makes musical expression difficult to achieve; and poor consistency due to buttons having varying performance between the respective buttons on an instrument, for example one button triggering at a force of half that of the force required to trigger one of the other buttons, which can be perceived as low quality by user.

In order to achieve a more user-friendly and higher quality product these issues need to be addressed.

As described in more detail below in relation to FIG. 1, the typical configuration of a currently used button is to have a button actuator located over a contact pad on a PCB with an FSR substrate located between the actuator and PCB. The FSR substrate is separated from the PCB by spacer ink around the contact pad, and has a conductive layer on the underside of the substrate that is pushed into contact with the contact pad when the actuator of the button is pushed by user.

To address the poor sensitivity and poor consistency issues, a solution attempted by a number of manufacturers is to reduce the thickness of the spacer ink in order to either reduce the gap between the conductive layer and the contact pad or to remove the gap entirely. When the gap is reduced, this means the button will activate at a lower force, which makes it more sensitive to light touches and reduces the difference in the force that needs to be applied to activate all of the buttons, but reduces the dynamic range of the buttons. When the gap is removed, this means the button will be continuously active. This makes the mechanism susceptible to variations between buttons and also false triggers. Attempts to overcome these factors include providing a user adjustable function to electrically control a trigger threshold of the button. However, this reduces the dynamic range of the buttons further since there is a greater amount of contact between the conductive layer and contact pad at even the lightest of touches which immediately increases the output of the button to close to its maximum.

Accordingly, these issues need to be addressed simultaneously without causing deterioration in the performance of such buttons.

SUMMARY OF INVENTION

According to a first aspect, there is provided a button for (for example, suitable for) varying output based on force applied, the button comprising: a contact pad with at least two contacts, the contacts being arranged in a complementary pattern of interdigitated fingers with a separation therebetween; and an actuator and a conductive layer, the conductive layer being located between a base of the actuator and the contact pad and being independent of the actuator and contact pad, the base of the actuator being shaped to increase the surface area of the conductive layer in contact with the contacts as the actuator is pushed towards the contact pad, thereby increasing current flow between the contacts in use as the force applied to the actuator increases.

By the phrase “force applied”, we intend to mean force input, such as force input by a user exerting force on the button or a component thereof. The phrase “current flow” is intended to mean electrical current flow. The term “independent” is intended to mean separate, such as mechanically separate or a component on supported by or attached to the components from which it is independent.

Due to the surface area of the conductive layer in contact with the contacts being raised as the force applied to the actuator is increased and the conductive layer being independent from the actuator and contact pad, the sensitivity to the force applied by the user is enhanced. This also allows a greater dynamic range of the button because the minimum force at which the button is able to be reliably activated (in other words triggered by the force applied by the user to provide an output) is reduced compared to conventional buttons capable of detecting force. Accordingly, low forces can be detected whilst also increasing the range of forces over which the button is operable.

The actuator may be non-deformable and/or may be made of any suitable material. Typically however, at least a portion of the actuator is deformable, the at least a portion including the base of the actuator, the portion being arranged to deform as force is applied to the actuator by a user and the conductive layer is in contact with the contact pad. This reduces the need for the conductive layer to be compressed as the amount of force applied to the actuator increases, which reduces wear and the possibility of failure of the conductive layer. Of course, the portion of the actuator that is deformable may be the whole of the actuator as well as part of the actuator.

The base of the actuator may have any suitable shape to allow the surface area of the conductive layer in contact with the contact pad when force is applied to the actuator to be increased. Typically, the actuator base, when in a non-deformed state, has a cross-sectional profile having at least one portion proximal to the contact pad and at least one portion distal to the contact pad and having an incline therebetween. This provides a mechanical, and easily manufacturerable, actuator to allow the amount of force applied by a user to be translated into an increasing current flow, thereby allowing for a simple construction and minimal component count while still allowing a variable output to be achieved. In this configuration, as force is applied by user to the actuator, and the actuator causes the conductive layer to press against the contact pad, the deformable portion of the actuator is made to deform to reduce a difference in distance between the at least one portion proximal to the contact pad and the distance between the at least one portion distal to the contact pad thereby reducing the incline therebetween. During use, the incline may be reduced entirely due to the deformation of the deformable portion so there is no difference in distance to the contact pad between the at least one portion proximal to the contact pad and the at least one portion distal to the contact pad.

There may be a plurality of portions proximal to the contact pad and/or a plurality of portions distal to the contact pad. Typically, there is only a single portion proximal to the contact pad and/or only a single portion distal to the contact pad when the deformable portion of the actuator is in a non-deformed state.

The at least one portion proximal to the contact pad may be located radially outward of the at least one portion distal to the contact pad. Typically however, the at least one portion proximal to the contact pad is radially inward of the at least one portion distal to the contact pad. This reduces the dependence on the direction from which a user interacts with the actuator by directing the initial force through the actuator closer to its centre point than to its external perimeter. This improves the consistency of the current output achievable when using button since the force will all be directed from the centre point of the actuator outward instead of from one side, where a user may push the actuator from, across the rest of the base of the actuator.

The at least one portion distal to the contact pad may be located at any suitable location on the base of the actuator. Typically, the at least one portion distal to the contact pad is at the outer perimeter of the actuator base. This allows for a smooth and gradual increase in the surface area of the conductive layer that is in contact with the contact pad as the actuator is pushed by a user. This is instead of a rapid increase due to proximity between the proximal portion to contact pad and the distal portion to the contact pad or any undulation in the base radially outward from the distal portion to the contact pad. This allows for an improved user experience.

The at least one portion proximal to the contact pad may be located in any suitable location, such as radially outward of the radial centre of actuator base, which would allow a doughnut or torus shape to be provided either with curved, flat or bevelled sides between the one or more distal portions and the proximal portion. Typically however, the at least one portion proximal to the contact pad may be in a radially central region of the actuator base. This allows the greatest distance laterally between the at least one portion proximal to the contact pad and the at least one portion distal to the contact pad. Having this lateral distance allows for the incline to be as shallow as possible to make the transition from a low current output and a low force to a high current output at a high force to be as smooth as possible and to give the user as great a dexterity as possible to cause the button to detect the desired force.

The incline may be curved or non-curved (such as straight). Should the incline be curved, the incline may be concave in shape. Typically, the incline is a convex incline. In other words, the incline may have a convex shape or maybe convex in shape. This provides a greater rate of increase in the surface area of the conductive layer in contact with the contact pad at lower forces relative to the rate of increase in the surface area of the conductive layer in contact with the contact pad at higher forces. This allows the user greater dexterity at lower forces, and therefore a greater ability to differentiate between the strength of light touches. This may also be referred to as providing a "higher resolution" at a low force than at a high force, which will be desirable for a user looking to create intricate outputs. A curved incline may also be easier to manufacture than a straight incline due to the difficulty of manufacturing the sharp edges that create a knife edge like shape that would be present at the ends of a straight incline. This would also apply to a concave incline due to the sharp edges this would include.

The actuator base may be any suitable shape, such as square, triangular, hexagonal or any other polygonal shape. Typically, the actuator base is circular. This further reduces the dependence of the actuator on the direction on which it is interacted with by user. This allows a greater consistency in the output for the button regardless of the direction from which a user interacts with the actuator.

The contact pad may also be any suitable shape, such as square, triangular, hexagonal or any other polygonal shape. Typically, when the actuator base is circular, the contact pad is circular. This allows the shape of the contact pad to match the shape of the actuator base causing them to be cooperative shapes and therefore making the button more reliable since the force applied to the actuator is able to be applied to the contact pad in a manner that means the whole actuator base and/or contact pad is used instead of using only a portion of the actuator base and/or contact pad.

The fingers (i.e. the interdigitated fingers of the contacts of the contact pad) may be orientated in any suitable manner. This may include the fingers being grouped or interdigitated with other fingers within a particular region and there being multiple regions. Typically, each finger of the contacts may have a longitudinal axis aligned with the length of the respective finger, and the longitudinal axis of each finger may be radially orientated relative to the contact pad. This allows for a more uniform arrangement of the fingers compared to fingers being interdigitated in a number of regions. The increased uniformity provides a more linear increase in the possible current output from the contact pad as the surface area of the conductive layer in contact with the contact pad increases. The simplifies the processing of the current output (which may also be referred to as the "signal") since the circuitry receiving the signal only needs to be arranged to respond to a linear increase or decrease in current from the contact pad.

Each finger of the contacts may have any suitable shape, such as having straight edges, being triangular in shape or any other form. Typically, the fingers each have one or more projections extending laterally to the longitudinal axis of the respective finger. This increases the surface area of the contacts and increases the perimeter length of the fingers of each contact. This improves the reliability of the button since there are more possibilities for making connections between the contacts. Additionally, this may increase the dynamic range of the button since there is a greater surface area for the conductive layer to come into contact with as force is applied to the actuator by a user. This means there is a greater amount of precision that can be achieved between a minimum output and a maximum output. This may be achieved because the projections of adjacent fingers may interdigitate with each other.

Each finger may have a single projection, or multiple projections, and when there are multiple projections the projections are able to be arranged at any suitable position on the respective finger such as aligned or adjacent to each other on opposing sides of the finger. Typically, each finger has a plurality of projections extending laterally to the longitudinal axis of the respective finger, the projections being radially spaced along the longitudinal axis of each respective finger. Having multiple projections on a finger that are radially spaced along the length of finger improves the linearity of the output from the contact pad since the length of the outer perimeter is not significantly increased in one part of the finger relative to another part of the finger, which would cause a rapid increase in output as a connection is made at one point along the finger compared to another point along the finger.

When there are multiple projections on each finger, the projections may be arranged in any particular arrangement or pattern, such as having all the projections on one side of the finger, having more projections on one side of the finger than the other or having an asymmetric pattern of projections on each side of the respective finger. Typically, the projections are arranged symmetrical along the longitudinal axis of each respective finger. This allows for a lower failure rate during manufacture. This is because this arrangement avoids having sections of each respective finger that are significantly narrowed due to any asymmetric pattern, which are more likely to be damaged or improperly formed during manufacture of the contact pad.

The one or more projections on each finger may have any length (i.e. the distance by which the projection(s), or at least the tip thereof, extend from the longitudinal axis of the respective finger for example). Typically, the length of the projections increases based on the proximity of the projection to the outer perimeter of the contact pad. By the length of the projections increasing based on proximity of the projection to the outer perimeter, we intend to mean that the closer a particular projection is to the outer perimeter of the contact pad, the longer the projection may be. This further increases the length of the outer perimeter of each respective finger by giving it an undulating shape instead of a central section that steadily widens towards the outer perimeter of the contact pad. This extra outer perimeter length further increases the reliability of the button by providing increased opportunities for the button to be triggered when force is applied to the actuator pushing the conductive layer into the contact pad.

There may be two or more contacts on the contact pad depending on the desired outputs. Typically, the contact pad has a first contact and a second contact, each contact having fingers interdigitated with fingers of the other contact, the fingers of a first contact being connected to a circuit at an outer perimeter of the contact pad and the fingers of second contact being connected to a circuit at an inner perimeter of the contact pad. By “first contact” and “second contact” we intended to mean that each of these contacts provide a contact of the contact pad. By providing a connection to a circuit at an outer perimeter for the first contact and at an inner perimeter for the second contact the connections for each contact kept separate. This reduces the chances of a short circuit being produced during manufacture.

As set out above, there is a separation between each of the interdigitated fingers (i.e. there is a separation between adjacent fingers). This separation may be any shape, width or length. Typically, the separation between the interdigitated fingers is curved. This simplifies manufacture since no sharp corners need to be formed, which are more difficult to fabricate. This curve may be produced by one or more projections on the respective fingers, or maybe produced by the shape of the fingers themselves.

The curve of the separation between the fingers may be a continuous curve. This is instead of being a discontinuous curve, which would be an alternative. By having a continuous curve, this improves the reliability of the button by producing a regular pattern and therefore providing more possibilities for intersections between the contacts to be produced.

Typically, the separation between the interdigitated fingers may be the same width along the length of each separation. By width of the separation, we intend to mean the shortest distance between one finger and an adjacent finger. By having a consistent width along the length of each separation, the linearity of the response from the contact pad as the conductive layer is pressed into contact with the fingers is improved since there are a consistent number of connections made across the full range of force that is able to be applied to the actuator that pushes the conductive layer into the contact pad.

The contacts of the contact pad may be standard PCB contacts or may be coated to protect the PCB contact from corrosion and/or to enhance conductivity. Typically, each contact of the contact pad has a carbon ink coating, the contact between the conductive layer and the contacts being provided by contact between the conductive layer and the carbon ink coating. We have found that using carbon ink as a coating for each contact improves the sensitivity of the button to a change in force. This is due to the carbon ink forming a dome like cross section when being formed, which allows the conductive layer to be moulded round the coating when force is applied to the button increasing or decreasing the surface area of the conductive layer in contact with the contacts as the amount of force being applied is adjusted. Additionally, the ink is non-oxidising and hard wearing, which makes it suitable for long life applications, where high contact cycles are required.

It is worth noting that the carbon ink or carbon based ink is not required. However, to avoid damage to the contact pad through oxidisation or corrosion, an alternative finish would typically be needed for the contact pad. Suitable alternative coatings would include gold plating or silver plating. Gold and silver are more costly than using carbon ink or carbon based ink however.

The use of carbon ink coating may be a further reason to use a continuous curve for the separation between the fingers. This is because the ink is typically applied using a screen print process, and the absence of sharp corners improves production yield of the screen print process, thereby improving the manufacture reliability of the contacts and simplifying manufacture by reducing the number of sharp corners. As such, when carbon ink coating is used on the contacts, the separation between the fingers may be a continuous curve.

The conductive layer may be held between the actuator and the contact pad. This maintains the axial arrangement of the conductive layer, actuator and contact pad.

The conductive layer may be suspended between the actuator and the contact pad. This enhances the dynamic range of the button by limiting the engagement between the conductive layer, actuator and contact pad when not in use.

The conductive layer may be attached to a substrate, the substrate being supported radially outward of the contact pad. This reduces the effect any substrate to which the conductive layer is attached has on engagement of the conductive layer with the contact pad.

The substrate may be supported on a surface on which the contact pad is located. This provides a support structure for the substrate.

The button may further comprise a cover arranged in use to provide an outer casing for the button, the cover having an aperture providing access to the actuator. This provides protection for the over components of the button while still allowing a user to interact with the actuator. Typically the actuator is located within the aperture of the cover and may project through the aperture.

The cover may have pins arranged in use to project from the cover to a support for the contact pad thereby holding the cover at a minimum distance from the support. The pins may be provided by legs attached or formed on the cover. The support for the contact pad may be a contact pad substrate or some other layer or structure. Typically this may be the PCT on which the contact pad is a component. The pins prevent the actuator support and any other layers between the cover and the contact pad support from being compressed against the support in use. If such compression did occur, this could affect performance of the button, such as excessive compression causing false triggering of the button and, in some cases, reduction the trigger sensitivity.

The actuator may be independent from (i.e. a separate component from) the contact pad (in addition to being independent from the conductive layer), or may be linked to the contact pad and/or to one or more other components. Typically, the actuator is connected to a support, the support being arranged in use to urge the actuator away from the contact pad. This allows the actuator to apply minimum force to the contact pad via the conductive layer when a user is not interacting with the actuator. This means a minimal amount of current passes through the contact pad when the actuator is not being pressed by a user, which reduces the electricity usage of the button and also increases the dynamic range of detectable forces by limiting the continuous interaction of the conductive layer with the contact pad to a minimum. Typically, when the actuator is not being interacted with by a user (or in other words the actuator is in a rest state), no current is passing through the contact pad.

The support may take any suitable form, such as a spring, hinge or compressible element. Typically, the support comprises a reflex structure and a holder, the reflex structure being connected to the actuator and the holder and being resiliently deformable, thereby providing the urging of the actuator in use. The reflex structure assists with directing movement of the actuator toward and away from the contact pad making the button more reliable.

The reflex structure may be any suitable shape, such as a curved portion or a straight portion. Typically, the reflex structure is L-shaped, the reflex structure being connected at one end to the holder and to the actuator at an opposing end. This allows the actuator to be urged away from the contact pad as well as also minimising the mechanical resistance to movement, which increases the sensitivity of the button since the actuator moves more readily when interacted with by a user. By opposing ends of the "L" shape, we intend to mean the actuator being connected, for example, to the upper end of the upright portion of the "L" and the holder being connected, for example, to the base of the "L" at the end of the base distal to the upright portion of the "L".

The conductive layer may be in contact with the contact pad when no force is applied to the actuator. Typically however, when there is an absence of user applied force there is a separation between conductive layer and the contact pad. This increases the dynamic range of the button. This is achieved by there being no current passing through the contact pad until the conductive layer comes into contact with the contact pad. This allows the greatest range of forces to be applied since if a current is already passing through the contact pad the difference in current between that amount already passing through and the maximum amount able to be output is less than the difference between no current being output and the maximum amount of current able to be output.

The support to which the actuator may be connected may be supported by the substrate to which the contact pad may be attached. This provides a layered structure to the button simplifying manufacture of the button and limiting the needed intricacy of the support structures for the various components.

The actuator may be separated from the conductive layer by a gap between the actuator base and the conductive layer or any layer supporting the conductive layer when no force is being applied to the actuator by a user. Alternatively, the actuator may be in contact with the conductive layer or any layer supporting the conductive layer when no force is being applied to the actuator by a user.

According to a second aspect, there is provided a button array, the button array comprising a plurality of buttons according to the first aspect. This allows multiple buttons to be used, and due to each button being configured in accordance with the first aspect, there is an increased consistency in how the buttons each react to force applied by a user. This improves the user's experience of using the button array since each button reacts in a more similar way to each other button when pressed. This is in comparison to conventional button arrays used to detect force applied by a user.

Each button of the button array may be a separate component from each other button of the button array. Typically however, the plurality of buttons is connected by a single substrate. This simplifies the manufacture process allows the whole button array to be fabricated in a single process instead of each button having to be manufactured separately, which could lead to variations between buttons. Of course, there may be a plurality of substrates, each with one or more buttons, which can then be used to provide a button array using the plurality of substrates.

The button array may have a single support structure to which all the actuators of the button array are connected in an array, or there may be a plurality of support structures each of which with one or more actuators connected thereto.

BRIEF DESCRIPTION OF FIGURES

An example button and an example button array are described in detail herein with reference to the company figures, in which.

DETAILED DESCRIPTION

The figures described below detail the arrangement and configuration of examples according to the first aspect and second aspect. This sets out example button and button array set ups. A number of the figures illustrate prior art buttons and/or components thereof as a comparison to the examples of the first aspect and the second aspect. For example, a prior art button is generally illustrated at 100 in FIG. 1.

The button 100 is based around an FSR. The FSR is provided by a contact pad 102 and a conductive layer 104.

The contact pad 102 is formed on a PCB 106. As is set out in more detail below in relation to FIG. 6*a* the contact pad has two contacts 108, 110, each with figures that interdigitate with figures of the other contact.

Figure 1:
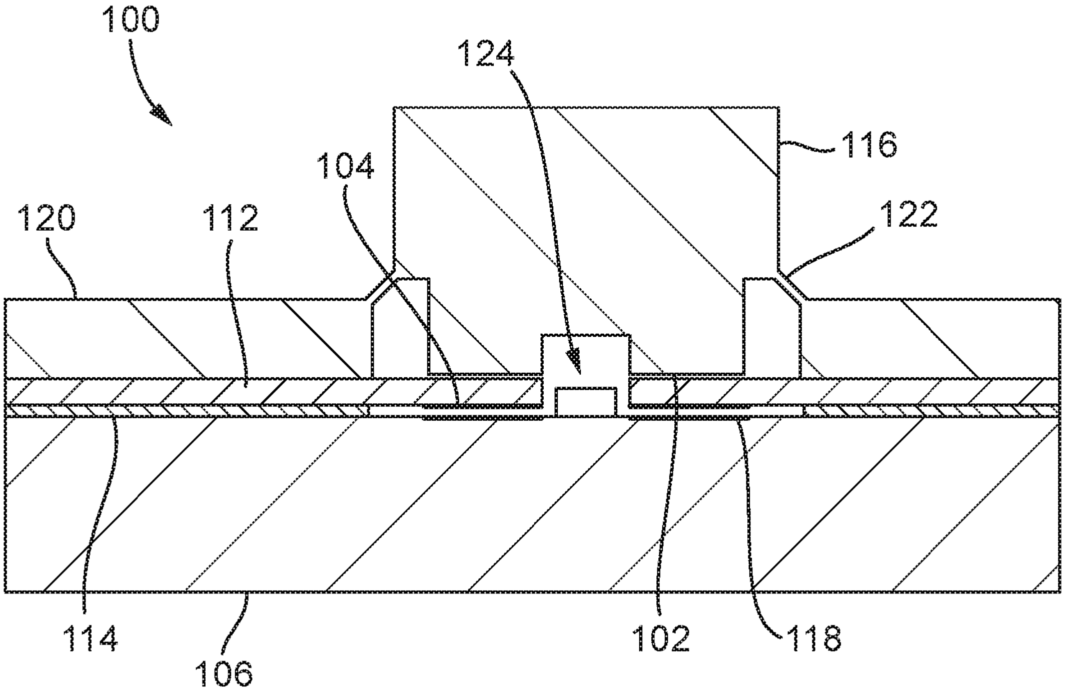
Fig. 1 Prior Art
FIG. 1 shows a cross-sectional view of an example prior art button.

In the example shown in FIG. 1, the conductive layer 104 is supported above the contact pad 102 with a separation between the conductive layer and the contact pad when the button 100 is not in use (as shown in FIG. 1). In other prior art examples, this separation or gap is reduced to either a smaller separation or completely so there is no separation. In the latter case, the conductive layer rests on the contact pad even when the button is not in use.

In the example shown in FIG. 1, the conductive layer 104 is held spaced apart from the contact pad 102 due to its mounting. The conductive layer is mounted to the underside of a substrate layer 112. The substrate layer is in turn held away from the contact pad by a spacer 114 located on either side (and around) the contact pad. The separation between the conductive layer and the contact pad is thereby provided by the thickness of the spacer. In the prior art examples where the separation between the conductive layer and the contact pad is reduced or not present, this is achieved by having a less thick spacer, or no spacer at all.

The substrate layer 112 is flexible to allow the conductive layer 104 to be pushed into contact with the contact pad 102 to form a completed circuit. Because this is not practical for a user to use as a button, an actuator 116 is located over the substrate layer at a position coaxial with the conductive layer and the contact pad.

A base 118 of the actuator 116 is located just above the substrate layer 104 with a small separation between base and the opposite side of the substrate layer to which the conductive layer 104 is mounted. The base is a flat surface with a profile that is parallel to the substrate layer.

The actuator 116 is connected to a keymat 120, which is used to support the actuator and hold it in position. This is achieved using a reflex structure 122 that extends directly from the main body of the keymat to the body of the actuator.

In use, the button 100 illustrated in FIG. 1 is interacted with by the user pushing an upper surface of the actuator 116 towards the contact pad 102. This pushes the base 118 of the actuator into contact with the substrate layer 104, deforming the substrate layer and pushing the conductive layer 104 into contact with the contact pad. This completes a circuit allowing current to pass through the contact pad. The amount of current passing through the contact pad is proportional to the amount of force applied by the user actuator. This is due to a greater surface area of the conductive layer making suitable contact with the contact pad, which causes a change in the impedance between the two contacts, and/or the conductive layer changing resistance as additional force is applied due to the conductive layer being a conductive polymer used in an FSR, which changes impedance based on force exerted on it.

When the user releases the actuator (i.e. when they stop pushing the actuator), the reflex structure 122 urges the actuator away from the PCB 106. This allows the substrate layer to return to its un-deformed shape, breaking the circuit made by the conductive layer.

Figure 2:
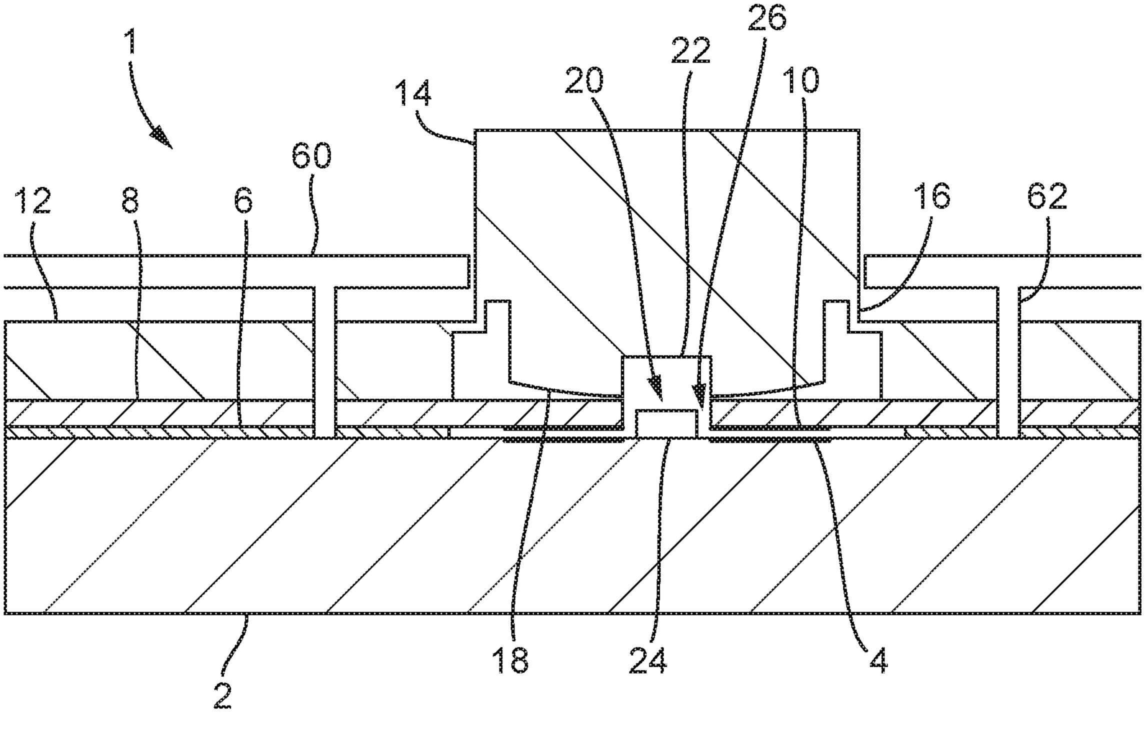
FIG. 2 shows a cross-sectional view of an example button.

Turning to an example according to the first aspect, such an example button is generally illustrated at 1 in FIG. 2. Similarly to the prior art example shown in FIG. 1, in this example, the button has a PCB 2 on top of which the relevant components are located. There may be other components than those shown. However, those components are of less relevance to the functionality of the button of this example.

The PCB 2 of this example includes a contact pad 4 located on a surface of the PCB. A spacer 6 is mounted on the same surface of the PCB as the contact pad. In this example the spacer is a spacer ink deposited on the surface of the PCB. In other examples, the spacer may be provided by solid materials fastened to the PCB either with a fastening or using adhesive.

A substrate layer 8 is mounted on opposing surface of the spacer 6 to the surface of the spacer mounted to the PCB 2. The substrate layer extends over the contact pad 4, overlying and covering the contact pad. Due to the spacer, a gap is provided between the substrate and the contact pad where the substrate overlies the contact pad.

A conductive layer 10 is mounted to the substrate layer 8 where the substrate layer overlies the contact pad 4. The conductive layer is mounted to the substrate layer on the same surface of the substrate layer that abuts the spacer 6. The conductive layer is a conductive polymer.

In this example the conductive layer 10 is an ink deposited on the substrate layer 8. In other examples, the conductive layer may be a solid material, such as a conductive polymer sheet affixed to the substrate layer by a fastening or adhesive.

The thickness of the conductive layer 10 is not sufficient to close the gap between the substrate layer 8 and the contact pad 4. As such, in this example there is a gap between the conductive layer and the contact pad. While the gap may vary between examples, in this example, the gap between the conductive layer and the contact pad when no force is being applied by a user is about 0.062 millimetre (mm) (so about 62 microns (μm)).

The PCB 2 may be formed in any conventional manner used to fabricate a PCB. The various inks that are used may be applied to the respective surface to which they are applied by printing or a deposition process. For example, the FSR sheet, which is the substrate layer 8, is a die cut piece of PET plastic. In this example, this typically has a thickness of about 0.188 mm. The various inks that are applied to the PCB and to the substrate layer are each typically applied by a screen print process.

During the manufacture of the button, the first ink layer that is applied is the conductive ink for the conductive layer 10. As noted above, in this example, this is a high impedance ink. In this example, this ink is typically printed at a thickness of around 6 μm. In some examples the ink is applied to the substrate layer 8 by a silk screen printing process.

The second printed layer is the spacer ink for the spacer layer 6. In this example, the spacer ink is typically applied at a thickness of 68 μm.

The difference between the spacer ink thickness and the carbon ink thickness provides the gap between the FSR ink (so the ink for the conductive layer 10) and contact pad 4; in this example the carbon ink being ink applied to the contacts of the contact pad as set out above and in more detail below. In this example, the printing thickness tolerances are +/−13 μm.

A keymat 12 is mounted on an opposing surface of the substrate layer 8 to the surface in contact with the spacer 6. The keymat in combination with the spacer and the substrate layer provide an assembly stack for the button 1.

As can be seen from FIG. 2, the keymat 12, substrate layer 8 and spacer 6 are all mounted one on top of the other on the PCB 2. This mounting of the various layers on top of each other provides a layer structure with portions of adjacent layers, once fabricated, continuously in contact with each other. The layer structure is laterally offset from the contact pad 4. By using this structure the various components with which a user engages and which are moved or react to user engagement are able to be supported from the side instead of underneath. This makes the separation between various components or portions of components to be achieved so as to allow the advantages generated by the separation to be provided to a user.

In this example the keymat 12 provides a support structure for an actuator 14. In other examples the support structure may be provided by a form of frame or other structure.

The actuator 14 is located over the region of the PCB 2 where the contact pad 4 is located. This means that in this example the contact pad, conductive layer 10 and the actuator are arranged coaxially. In other examples, these components may be arranged with offset or alternatively orientated axes.

The actuator 14 is connected to the keymat 12 by a reflex structure 16. The reflex structure in this example is "L" shaped with one end of the reflex structure connected to the actuator and the opposing end of the reflex structure attached to the keymat.

The actuator 14 is generally cylindrical in shape. In this example, one end of the cylinder is square with a flat end, the flat end being orientated generally parallel to the surface of the PCB 2 on which the contact pad 4 is located. This is the surface with which the user typically interacts by applying force to the surface with one or more fingers or their hand.

Due to the height of the cylinder the main body of the actuator 14, the flat end of the actuator extends above the keymat 12 away from the PCB 2. Although not shown here, a casing may be used to protect the keymat by providing a barrier between an exterior of the apparatus in which the button may be incorporated and the interior. In this situation, the actuator flat end extends through an aperture in the casing to allow the user to interact with the actuator. By way of example, the flat end of the actuator may be about 20 mm by 20 mm in size, such as about 20.6 mm by 20.6 mm. The height of actuator from the flat end to the furthest point of the actuator base from the flat end may be between about 10 mm to about 50 mm, and preferably between about 15 mm and 35 mm or 10 mm to 14 mm.

To allow the reflex structure 16 to connect to the actuator 14 the sides of the main body of the actuator narrow at the point at which the reflex structure connects to the actuator. This allows the tip of the end of the "L" connected to the actuator to be the point on the reflex structure connected to the actuator. This allows force transferred to the reflex structure from the actuator to pass directly along the stem of the "L" instead of being directed round a corner. This reduces the amount of wear and the connection extending the lifespan of the product. In other examples, this connection could be between a side of the stem of the "L" or any other suitable form.

In some examples the main body of the actuator 14 narrowing where the reflex structure 16 connects to the actuator could be a gradual curve or sloped incline. In this example however, the narrowing is provided by an inverse step causing the actuator to have a wider diameter above the connection to the reflex structure (i.e. closer to the flat end of the actuator) than below the connection to the reflex structure. Additionally, the walls of each portion of the actuator in this example are generally upright.

The change in diameter of the actuator 14 also allows the shape of the actuator to change. Above the connection to the reflex structure 16, the actuator is a square cylinder (although in various examples the corners of the cylinder are rounded, or this section is a different shape completely). This means the flat end of the actuator is square. In this example, below the connection to the reflex structure, the actuator is a circular cylinder. This can be seen most clearly in relation to FIG. 5*b*, which is described in more detail below.

The opposite end, also referred to as the actuator base 18, of the cylinder forming the actuator 14 to the flat end, in this example, is a dome. In other examples, the base may be a torus shape, a cone or pyramid shape or an inverted "U" shape.

In this example, the dome is convex. A further alternative is a concave shape where the actuator base 18 tapers to a point.

In this example the convex dome is provided by a smooth curve. In other examples, the convex surface may be provided by a faceted dome, which may have a plurality of flat surfaces each connected at their edges to other surfaces that each may a different orientation to the surfaces to which it is connected.

The dome provides an inclined surface tapering away from a radially central region of the actuator 14 towards the outer perimeter of the circular cylinder providing the main body of the actuator. Accordingly, when the button is not in use by a user, the base of the actuator has a portion proximal to the contact pad 4, which in this example is at a radially central region of the actuator base 18, and a portion distal to the contact pad, which in this example is as at the outer perimeter of the actuator base. In alternative examples, the location of the proximal portion and distal portion may be reversed, these portions may not be located at the furthest points of the actuator base 18 from each other, and/or there may be a plurality of proximal portions and distal portions.

By the phrase "not in use by a user" we intend to mean not in active use. In other words, we intend to mean occasions when the user is not pushing the actuator or actively using the button.

The FSR ink of the conductive layer 10 is applies to the substrate layer 8 instead of to the actuator base 18 since the ink is able to be applied to the substrate layer more controllably than it could be applied to the actuator base. This allows for greater accuracy and precision in the thickness of the ink applied to the conductive layer. It is also possible for other properties of the ink to be determined more accurately and precisely additionally or alternatively, such as the resistance of the FSR ink. This greater level of control allows the properties of the conductive layer to be tailored more specifically to how the button is intended to be used, thereby enhancing the user experience when the button is in use.

Figure 5A:
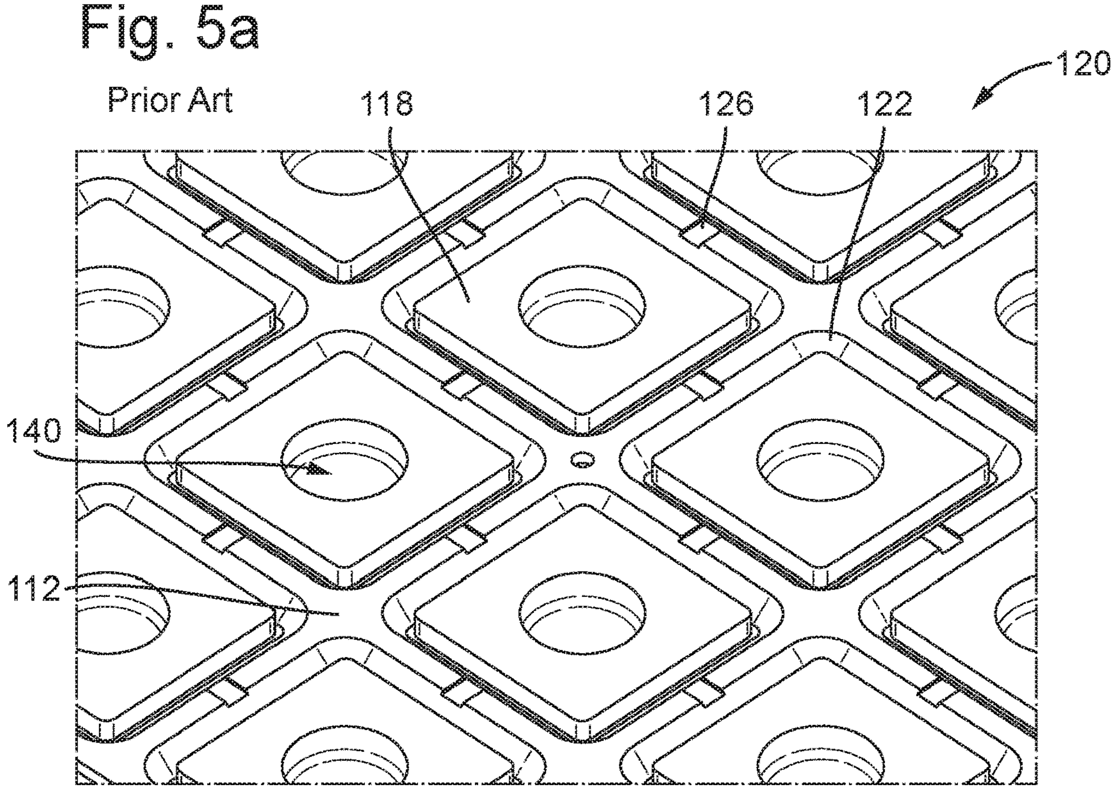
Fig. 5a Prior Art
FIG. 5*a* shows a schematic of an example prior art array of actuators.
Figure 5B:
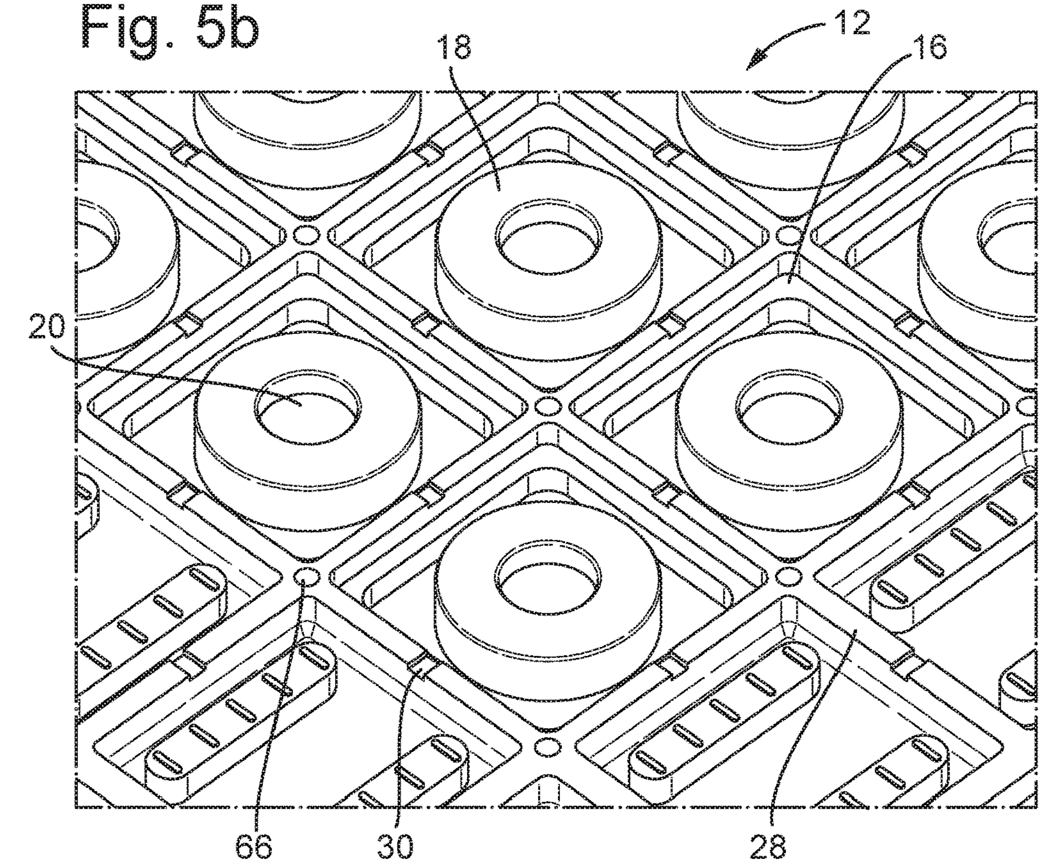
FIG. 5*b* shows a schematic of an example array of actuators.

At the radial centre of the actuator base 18 there is an aperture 20 (most clearly shown in FIG. 5*b*). The aperture provides an opening for a recess 22 in the body of the actuator 14. The recess and aperture are coaxial with an aperture 26 in the substrate layer 8, the conductive layer 10 and a Light Emitting Diode (LED) 24 mounted on the PCB. In examples where the LED is not present the apertures and recess may not be present. In further examples, when the LED is present, the apertures and recess may not be present.

In examples where the actuator 14 is not coaxial with the contact pad 4 and conductive layer 10 (unlike this example where they are coaxial), the aperture 20 and recess 22 may be positioned at a location other than the radial centre of the actuator. This is also the case where the LED 24 is not located at the radial centre of the contact pad (again, unlike in this example where the LED is located at the radial centre of the contact pad), but is located elsewhere.

The LED 24 is present to provide light when the button has been triggered by the user. How the LED responds to the button being triggered is dependent on how the circuitry and/or software driving the LED is configured and/or programmed. The LED may be a monochrome LED or a multicolour LED, such as and LED comprising a red LED, a blue LED and a green LED, which may also include a white LED.

In this example the actuator 14 is deformable. In other examples only a portion of the actuator including the actuator base 18 may be deformable. The deformable nature is provided by the material of which the deformable part (whether all or part of the actuator) is made.

The actuator 14 is deformable in this example in order to allow the actuator base 18 to deform as the actuator is pressed by a user. When the actuator is not being pressed by a user, the portion of the base proximal to the contact pad 4 rests against the opposing surface of the substrate layer 8 to the surface on which the conductive layer 10 is located. This means that there is a gap between the portion of the base distal to the contact pad and the substrate layer due to the curve of the base. In other examples there may be a gap between the portion of the base proximal to the contact pad and the substrate layer as well, meaning the gap between the portion of the base distal to the contact pad is increased so that it is larger than the gap between the proximal portion and the substrate layer. Such a gap between the portion of the base proximal to the substrate layer may be about 0.05 mm.

As described in more detail below, when in use, the actuator 14 is pressed by a user. This causes the actuator to descend toward the contact pad 4. The actuator base 18 pushes the substrate layer 8 and the conductive layer 10 towards the contact pad 4 by deforming the substrate layer, which, in this example, is sufficiently flexible to allow (predominantly) elastic deformation.

When sufficient force is applied to the actuator 14 by the user, the conductive layer 10 is pressed into contact with the contact pad 4. As the force applied by the user increases, the actuator base 18 deforms and pushes more of the conductive layer into contact with the contact pad. When the user reduces the force applied to the actuator, the deformation of the base is partially or wholly reversed returning it to closer to its shape when not deformed, or to is non-deformed state depending on how much force is still applied to the actuator. This allows the substrate layer to return to or towards its non-deformed shape pulling the conductive layer partially or wholly out of contact with the contact pad. When the user completely releases the force of the actuator, the components of the button 1 return to the arrangement in which they started, i.e. the positions when not in use, also referred to as their “rest position”.

The actuator 14 is returned to this rest position due to urging applied by the reflex structure 16. The substrate layer 8 and the conductive layer 10 return to their not in use positions due to the resiliently deformable nature of the material the substrate layer is made of. This also applies to the deformable portion of the actuator since, in this example, this is also made of resiliently deformable material.

In the example shown in FIG. 2, the button 1 has a cover 60 located over the keymat 12. The cover has an aperture therethrough through which the actuator 14 is located. The cover has pins 62 that pass through the keymat 12, substrate layer 8 and spacer 6 by apertures through each of these layers. These pins are a form of (upright) leg. The pins rest against the PCB 2 to support the cover and prevent it from pressing against the stacked keymat, substrate layer and space. As such, in this example the pins are located on either side of the actuator.

In the example shown in FIG. 2, there is a gap present between the upper surface of the keymat 12 and the lower surface of the cover 60. In other examples, this gap may be a different size or may not be present.

The cover 60 is a plastic panel in various examples, but can be made of other materials. In use this is fitted over the keymat 12.

In some examples, there are a plurality of buttons 1 forming and array of buttons. Such an example is illustrated generally at 50 in FIG. 3. Each button in the array of buttons is formed and functions in the same way as the example button 1 described above in relation to FIG. 2.

Figure 3:
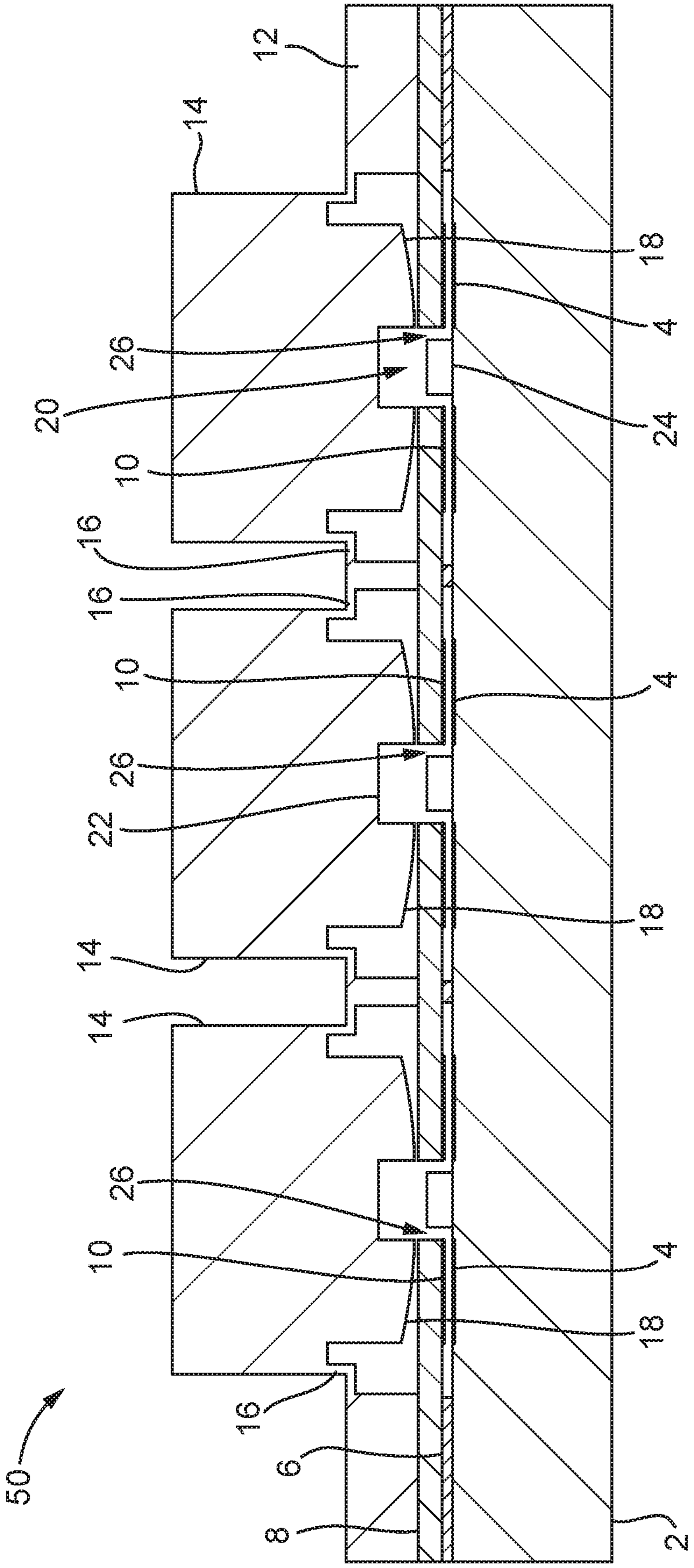
FIG. 3 shows a schematic of an example button array.

In the example shown in FIG. 3, there is a single keymat 12 which has a plurality of reflex structures 16, each of which is attached to a respective actuator 14 as described above. In other examples there may be a plurality of keymats, each with at least one reflex structure and corresponding actuator(s).

Additionally, in the example shown in FIG. 3, there is a single support layer 8 and spacer layer 6 (such as only a single support layer and/or only a single spacer layer). While alternatives are possible, in the example shown in FIG. 3, these layers are provided in the same manner as in the example shown in FIG. 2. The single support layer allows for simpler fabrication since the conductive layers 10 for each button are able to be applied to a single support layer, such as at a single time or via a single (printing) process.

The plurality of actuators are able to be used individually or in combination to provide a single response (either individually or in any possible combination, where use of each actuator causes a different response and/or where use of different combinations of actuators provide a single response) or a combination of responses. This is determined by the circuitry and/or software used in the assembly in which the button array 50 is used. As with the examples described above in relation to FIG. 2, the array of buttons may have a casing through which the actuators are accessible due to apertures in the casing.

When there are multiple actuators, the “L” shape of the reflex structure provides an advantage over and above those it already provides over known reflex structures. This is that while allowing a low mechanical resistance to movement, the reflex structures, individually and/or in combination, improve the mechanical isolation of each actuator from each other actuator. This reduces mechanical cross talk. This is because the reflex structures absorb movement propagating through the keymat due to the low mechanical resistance to movement, meaning the amount of movement that propagates to the respective actuator supported by each reflex structure is reduced.

Although not shown in FIG. 3, a cover, such as the cover 60 shown in the example of FIG. 2 is able to be located over the keymat 12 and perform the same function. In such an example the cover has pins that pass through apertures in the keymat, substrate layer 8 and space 6 and rests against the PCB 2 to perform the same function as described in relation to FIG. 2 above. These are typically located between adjacent actuators 14. The position of the cover relative to the keymat is also able to be the same as described above.

Figure 4A:
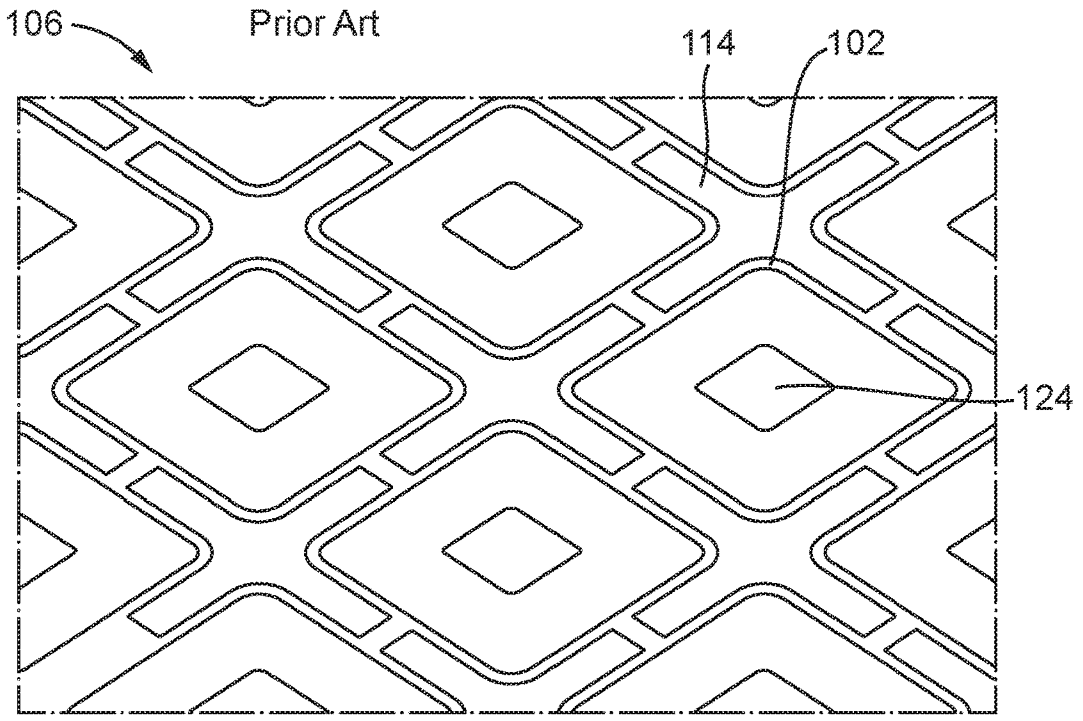
Fig. 4a Prior Art
FIG. 4*a* shows a schematic of an example prior art PCB.

FIG. 4 shows two example arrays of contact pads. FIG. **4*a* shows a prior art contact pad array on a PCB 106. Each of the contact pads 102 shown in this figure are used with the prior art button 100 shown in FIG. 1. In FIG. 4***a* each contact pad is generally square in shape with a square aperture at its centre. The aperture provides space for an LED. Around each contact pad in this figure, and between adjacent contact pads, spacers 114 are provided. As described in relation to FIG. 1, the spaces provide support for the other components of this button.

Figure 4B:
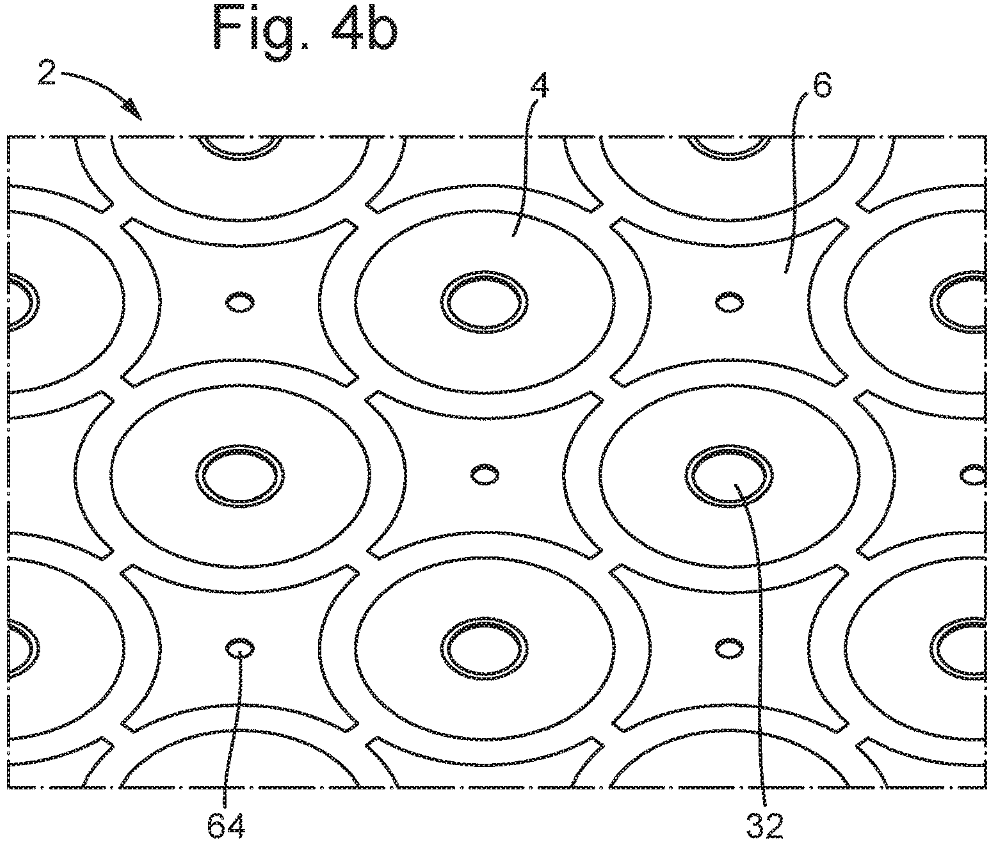
FIG. 4*b* shows a schematic of an example PCB.

FIG. 4*b* shows various components according to an aspect of the examples described herein, such as the examples described above in relation to FIGS. 2 and 3. This figure shows a PCB 2 on which are located and array of contact pads 4.

Between adjacent contact pads 4, spacers 6 are provided. In the example shown in FIG. 4*b*, there is a square array of contact pads. In other examples, there may only be a single contact pad, or the array may be a different shape, such as a hexagonal or hexagonal close-packed array. In examples where there is only a single contact pad, spacers are still provided in a similar manner to that shown in this figure in order to provide support for the components mounted on the PCB. In other words, spacers are provided around each contact pad regardless of whether there is only a single contact pad or are multiple contact pads.

Additionally, there is a separation between each contact pad 4 and the spacer 6 or spaces surrounding that contact pad. As is described in more detail in relation to FIG. 5*b*, this separation allows for airflow around the components.

In the example shown in FIG. 4*b*, the spacers 6 are each provided by spacer ink. The contact pad 4 in this example are also provided by conductive ink coated on to copper contacts. Typically this is a carbon ink or carbon based ink. In other examples, the contact pads may only be copper contacts (although this is unlikely due to the reactivity of copper with air and the oxidising properties of copper) or may be coated copper contacts coated with any suitable material, such as gold.

When carbon ink or carbon based ink is used as a coating on the contact pad 4 in this example (such as on the contacts of the contact pad), the ink is applied to the contacts on the PCB by a screen printing process. This process results in the ink having a domed cross-section, also referred to as a domed profile. This domed profile allows the conductive layer 10 to mould around the contacts as the force applied by a user increases. This increases the amount of surface area of the conductive layer in contact with the contacts. Additionally, the amount the conductive layer is moulded round the ink alters as the force applied by the user alters. This means smaller changes in the force being applied can be detected since the amount of surface area of the conductive layer in contact with the contact pad changes due to the moulding around the ink as well as due to the surface area changing by a greater or smaller overall area being in contact. This also improves reliability by making the contact between the conductive layer and the contact pad more defined due to the moulding that occurs. This would reduce the amount of false or accidental force detection.

In the example shown in FIG. 4*b*, the spacers 6 have an aperture 64 located at the centre of each spacer. This aperture is provided to allow the pins 62 of the cover 60 shown in FIG. 2 to pass through the space to rest against the PCB 2.

In FIG. 4*b*, each contact pad 4 is circular with an aperture 32 at its centre. The aperture provides space for an LED (not shown in this figure) to be mounted to PCB 2.

The circular shape of the contact pads 4 in FIG. 4*b* is matched by the shape of the actuator base 18 as shown in FIG. 5*b*. FIG. 5 shows the underside of a keymat with FIG. 5*a* showing a prior art keymat and FIG. 5*b* showing a keymat used as a component of an example as described above in relation to an aspect disclosed herein, such as in the examples described in relation to FIGS. 2, 3 and 4*b*.

FIG. 5*a* shows a keymat 120, which has a plurality of actuators 116 (the upper part of the actuators of which is not shown in in this figure). Each of the actuators shown in FIG. 5*a* has a base 118 that is a flat square. There is also an aperture 140 in the base providing a recess into which light from an LED is able to pass.

Each actuator 116 is connected to the keymat 120 by a reflex structure 122. There are also passages 126 provided in the keymat between each actuator and each adjacent actuator and the edge the keymat.

Instead of having a square base, the actuator 16 according to the example shown in FIG. 5*b* has a base 18 that is circular. As set out above, instead of being flat, the circular base is a convex dome in this example.

The dome in this example also has an aperture 20 providing an opening in the base recess 22. As mentioned above, in use, light from an LED is able to shine through the aperture into the recess.

The actuator base 18 in FIG. 5*b* provides an end to the circular cylinder portion of actuator 14. The circular cylinder portion forms the main body of the actuator with a square cylinder portion. The square cylinder portion is not visible in FIG. 5*b*. However, the reflex structure 16 connects to the square cylinder portion where the actuator body changes from a square cylinder to a circular cylinder. As such, in this example, the reflex structure is square to conform to the shape of the portion of the actuator to which it is connected.

In view of the reflex structure 16 being square, the framing provided by the keymat 12 to which the reflex structure is also connected is also square. The framing is the portion of the keymat that abuts the spacer 6 which the keymat sits.

Since the actuator is able to move when force is applied this means that the cavity created between the PCB 2, substrate layer 8, keymat 12 and actuator 14 changes in volume during use. To avoid air being trapped and causing disruption by being forced through unintended paths when pushed or pulled out of areas where it is located, the framing which is provided by upstanding walls 28, has openings 30 between each actuator and the adjacent actuator or actuators and between each actuator and an edge of the keymat should the actuator be located at a side of the keymat. This allows air to easily pass between locations within the button array 50 with which the keymat and plurality of actuators shown in FIG. 5*b* is used.

In the keymat 12 of the example shown in FIG. 5*b*, there are also apertures 66 formed through the keymat. The apertures are located, in this example, at the junctions of the upstanding walls 28. The apertures allow the pins of the cover described above in relation to FIG. 2 to pass through the keymat.

The keymat 12, plurality of actuators 14 and corresponding reflex structures 16 shown in FIG. 5*b* are manufactured by a compression moulding process. This allows various shapes wanted to be formed in a repeatable and accurate manner. This process may also be used when only a single button, such as the example button described above in relation to FIG. 2, is being manufactured. In more detail, the keymat is, for example, manufactured from a silicone material by compression moulding. The raw material is placed inside a tool as a block, or as multiple blocks. The tool is then shut and the material is compressed into the shape for the part.

In the examples shown in FIGS. 2, 3, 4*b* and 5*b*, the keymat 12 (along with the actuator(s) 14 and reflex structure (s) 16) are made of a silicone rubber. Typically the keymat and the other connected components have a material hardness of Shore A50. In other words, the material typically has a Shore durometer of 50 using a type A durometer.

In the examples shown in FIGS. 2, 3, 4*b* and 5*b*, the silicone material typically has a tint additive. This gives the material a 'milky' appearance and helps diffuse light from the LED.

As set out above, in use, the actuator is used to push a conductive layer into contact with the contact pad. FIG. 6 shows two varieties of contact pad, FIG. 6*a* showing a prior art contact pad and FIG. 6*b* showing a contact pad according to an aspect example described herein, such as according to the examples described in relation to FIGS. 2, 3, 4*b* and 5*b*.

Figure 6A:
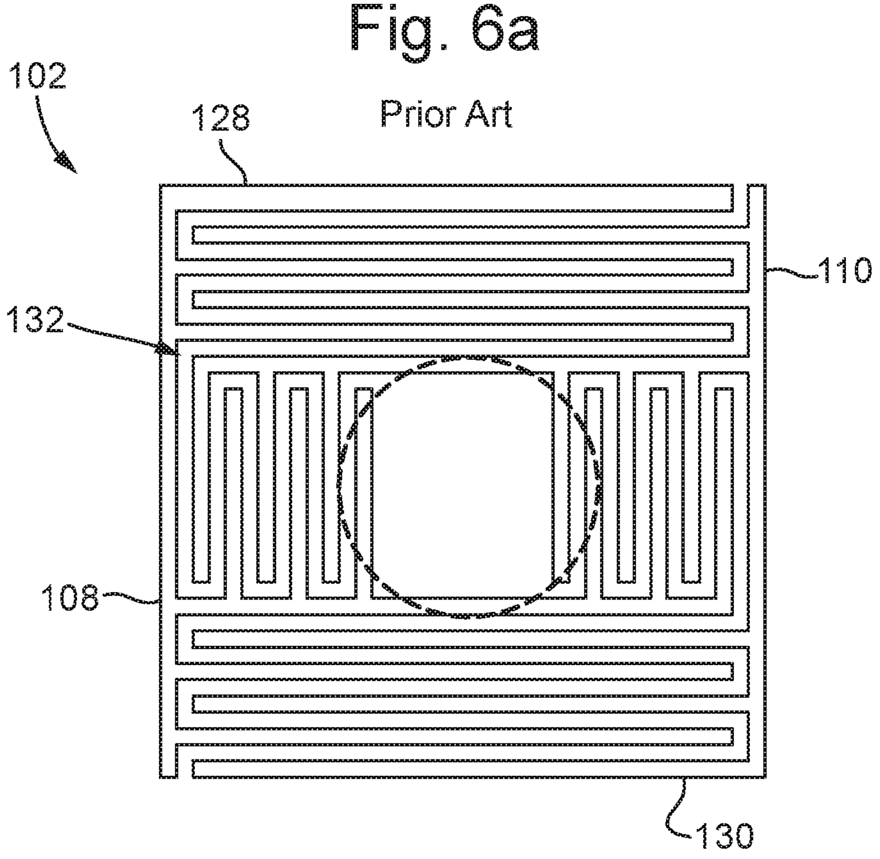
FIG. 6*a* shows a schematic of an example prior art contact pad.
Figure 6B:
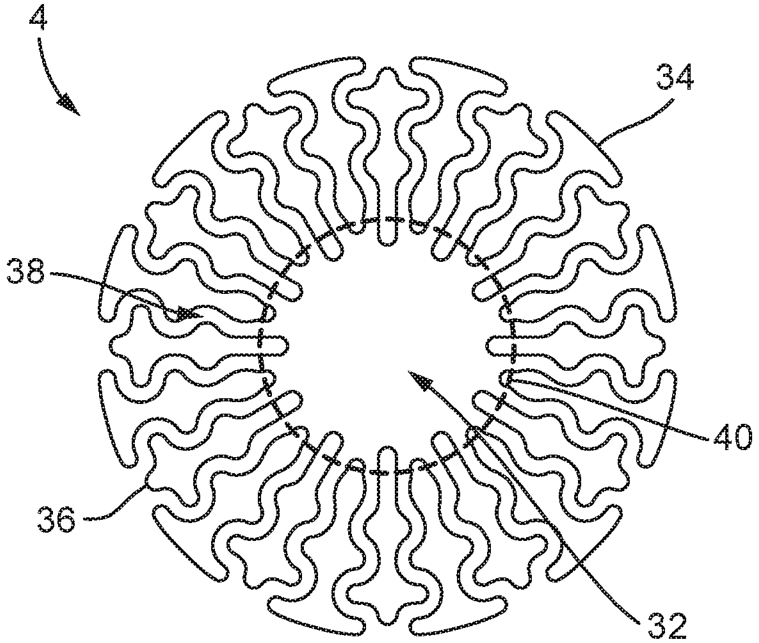
FIG. 6*b* shows a schematic of an example contact pad.

FIG. 6*a* shows a contact pad 102 according to the prior art. As set out above, this contact pad has a square shape. The contact pad itself has two contacts 108, 110, each with fingers that interdigitate with fingers of the other contact.

This figure shows that the contacts 108, 110 have a connection to the PCB circuitry at diagonally opposite corners of the contact pad 102 to each other. Each contact has a bar 126 that extends from the respective connection to the PCB circuitry along one of the sides of the contact pad. This bar has six fingers 128 extending from it away from the side of the contact pad from which the bar runs towards the bar of the other contact, which is located along the opposing side of the contact pad. Three of these fingers are located at the end of the bar distal to the connection to the PCB circuitry, and are interdigitated with three fingers of the other contact. At an end of the bar proximal to the connection to the PCB circuitry there are a further three fingers that interdigitate with three fingers of the other contact. These are the three fingers that are interdigitated with the three fingers at the distal end of the bar of the other contact. Each of the six fingers extends away from the bar in an orientation perpendicular to the bar.

The fingers 128 extending away from the bar 126 distal to the connection to the PCB circuitry and proximal to the PCB circuitry connection are each located in a region that spans about a third of the length of the bar. The remaining third in the middle of the length of the bar extends over the region where the aperture 124 in the contact pad 102 for the LED is located.

Due to the aperture, fingers of each contact 108, 110 cannot extend from the bar of one contact all the way to the bar of the other contact. As such, each contact has a finger 128 that provides an edge to the aperture. Each of these fingers has six fingers 130 extending from it perpendicular to the respective finger (and therefore parallel to the bar of the respective contact). These fingers are interdigitated with the corresponding fingers of the other contact and are approximately a third of the length of the bar of the respective contact. These shorter fingers fill the remaining area of the contact pad not filled by the aperture the other fingers of the contact pad 102.

One of the short fingers 130 of each contact 108, 110 provides a further side to the aperture 124 thereby giving the aperture its square shape. The short finger providing the side of the aperture from each respective contact is located on the proximal side of the aperture to the bar for each respective contact.

While the fingers 128, 130 of each contact 108, 110 are interdigitated with fingers of the other contact, there is no connection between the fingers of one contact with the fingers of the other contact. There is a continuous separation 132 between of the two contacts. This causes a break in the circuit of which the contact pad 102 is part. To close the circuit, an electrical connection must be made between the two contacts of the contact pad 102. This is achieved by the conductive layer 104 being brought into contact with the contacts.

In the prior art, the conductive layer 104 is brought into contact with the contacts 108, 110 of the contact pad 102 by the user applying a force to the actuator 116 causing the substrate layer 112 to deform. Should the user press the actuator in any location other than at the centre of the flat end presented to them, the contact made between the conductive layer and the contacts will be non-uniform due to a particular part of the actuator base 118 pushed into contact with the substrate layer before the rest of the actuator base comes into contact with the substrate layer. As mentioned above, this reduces the reliability and consistency of the connection made across the contacts, which makes the current able to pass through the contact pad from one contact to another variable. This reduces the ability to precisely detect the correct force and to detect a wide range of forces applied by user.

In contrast, this issue is reduced by the contact pad that provides a component of an aspect described herein, an example of which is shown in FIG. 6*b*. This figure shows a contact pad 4, which, in this example, is circular. This corresponds to the shape of the actuator base 18. In other examples, the contact pad may be a different shape, such as oval.

There is an aperture 32 at the centre of the contact pad 4. This aperture is circular and provides a space in the contact pad were an LED is able to be mounted to the PCB.

The perimeter of the aperture 32 provides a radially central region of the contact pad 4. The contacts 34, 36 of the contact pad are located between the perimeter of the aperture at the radially central region of the contact pad and the outer perimeter of the contact pad.

The contacts 34, 36 each have fingers that interdigitate with fingers of the other contact. The fingers are orientated so that a longitudinal axis of each finger, which runs along the length of each finger, is aligned with the radius of the circle of the contact pad for. In other examples, the orientation and shape of the fingers may be different.

The orientation of the fingers of each contact 34, 36 and the fingers being interdigitated with fingers of the other contact means the fingers alternate between the fingers of one contact and fingers of the other contact around the circumference of the contact pad 4. In examples where there are more than two contacts the arrangement of the fingers of each contact may be different.

In the example shown in FIG. 6*b*, the fingers of one contact 34, which may be referred to as a "first contact", are connected to the PCB circuitry at the outer perimeter of the contact pad 4, and the fingers of the other contact 36, which may be referred to as a "second contact", are connected to the PCB circuitry at the perimeter of the aperture 32. In other examples, the contacts may both be connected at an outer perimeter of the contact pad, or at the perimeter of the aperture.

To avoid any short circuit being created during the manufacture process, a separation 38 is maintained between the fingers of the first contact 34 and the perimeter of the aperture 32 and between the fingers of the second contact 36 and the outer perimeter of the contact pad 4. Due to the connections at the respective locations, this means that the fingers of the first contact extend further radially outward than the fingers of the second contact, and the fingers of the second contact extend further radially inward than the fingers of the first contact. This is achieved in various examples either by a wire like extension of the respective fingers or a connection to a conductive portion. These are not shown in FIG. 6*b*.

In the example shown in FIG. 6*b*, the fingers of each contact 34, 36 have projections. These may not be present in other examples. The projections in this example extend laterally outward from the longitudinal axis of the respective finger. In this example the projections extend laterally in a direction perpendicular to the longitudinal axis of the respective finger. In other examples, the projections may extend in other directions.

The projections on the fingers of the first contact 34 are complimentary with the projections of the fingers of the second contact 36. In this example this results in the fingers of the first contact having three projections on either side of each respective finger and the fingers of second contact having two projections on either side of each respective finger. In alternative examples, the fingers may have different numbers of projections to those of this example, and/or may have different numbers of projections on opposing sides of each respective finger.

In this example, the projections on either side of each respective finger are aligned giving the fingers a reflection symmetry axis along the longitudinal axis of each finger. In view of this, and the numbers of projections and the fingers of each contact 34, 36, the fingers of the first contact 34 have a projection extending outward on either side of each respective finger at the outer perimeter of the contact pad 4. The next radially inward projection is located on the fingers of the second contact at an end region of the respective fingers. This gives the radially outward end of the fingers of the first contact an uppercase "T" shape and the radially outward end of the fingers of the second contact a lowercase "t" shape (i.e. the appearance of the top section of a lowercase "t" with the horizontal bar and the portion of the stem projecting above the horizontal bar).

Radially inward of the most radially outward projections of the fingers of each contact 34, 36, as set out above, the projections on each finger alternate with the projections on each adjacent finger. The length of the projections (i.e. the distance the projections extend away from the longitudinal axis of the respective finger) increases the closer to the outer perimeter of the contact pad 4 the respective projection is located. As shown in FIG. 6*b*, in this example, this means the fingers of the first contact 34 have the longest projections.

The projections on each finger have a curved shape in this example. In alternative examples the curve may be replaced with straight sides. However, the curved shape simplifies the manufacture process. This is also why the curve is a continuous, which causes the fingers not to have any vertices, and only smooth curves for corners. The continuous curve shape causes the projections on each finger to give the outer perimeter to the respective finger a wave like shape.

As mentioned above, there is a separation 38 between each finger and the respective adjacent fingers. In this example, the separation has a consistent and constant width. In other examples the width of the separation may vary along the length of the separation.

FIG. 6*b* also shows a dashed line 40 around the innermost circle where that circle intersects with all the fingers of the first contact 34 and all the fingers of the second contact 36. This dashed line indicates the position at which initial contact is made between the conductive layer 10 and the contact pad 4 when the user applies sufficient force to the actuator 14.

As a user increases the amount of force applied to the actuator 14, a greater surface area of the conductive layer 10 brought into contact with the contacts 34, 36 of the contact pad 4. Typically, the increase in surface area contact spreads radially outward from the initial contact position. Due to the convex dome shape of the actuator base 18, this increase in surface area contact is relatively even in all radial directions regardless of the position on surface provided by the flat end the actuator from which the user applies pressure.

There may of course be some variation in the radial increase in the surface area contact as the user increases the amount of force applied to the actuator 14. This means that a greater surface area of the conductive layer 10 may be in contact with the contact pad 4 in one portion of the contact pad relative to another portion of the contact pad. However, the circular shape of the actuator base 18 and the convex domed shape minimises this variation.

As the surface area of the conductive layer 10 that is in contact with the contacts 34, 36 of the contact pad 4 increases with the increase of the user applied force on the actuator 14, there is a greater proportion of the contacts that have an electrically conductive connection between them. This allows an increased current flow through the contact pad. As such, as the amount of force applied by user to the actuator increases, the current passing through the contact pad increases proportionally.

The curved path followed by the separation 38 between the fingers of the first contact 34 and the second contact 36 produced by the projections of the fingers of each contact increases the length of the path relative to a straight path between adjacent fingers passing radially from the centre of the contact pad 4 to the outer perimeter. This increases the connection length of the contacts when a particular force is applied relative to when a straight path is used. This provides a greater connection length across the whole contact range, i.e. from where the conductive layer 10 first contacts the contacts to where the conductive layer is in contact with the whole of the contacts between initial contact position and an outer perimeter of the contact pad. This means a small adjustment in force applied by a user is more likely to cause an increase or decrease in the amount of connected surface area, which increases the precision able to be achieved by a user. This is due to the greater "resolution" able to be achieved between the minimum force able to be applied to cause a current to flow and the maximum force able to be applied to cause a maximum current to flow.

The reliability of the button being triggered (i.e. of contact being made across the contacts 34, 38 of the contact pad 4 by the conductive layer 10 was at least a minimum current flow) is improved over prior art systems. This is because the initial contact is made by a very small area of the conductive layer relative to the largest possible contact of the conductive layer (which occurs at the largest force detectable). This means all the force applied by a user at this triggering point passes through the actuator 14 and conductive layer to the contact pad only through this small area. This makes the pressure applied at this small area high relative to applying the same pressure across the whole surface area of the contact pad. Accordingly, this increases the likelihood of a conductive connection being made between at least one finger of the first contact pad 34 and at least one finger of the second contact pad 38.

The increased precision at the lowest force also extends to providing an increased precision in a lower force portion of the full range of forces detectable using the button. This is because the gradient of the slope of the convex dome of the actuator base 18 is low towards the centre of the actuator base compared to the gradient towards the outer perimeter of the actuator base. This means that, for a relatively small increase in force by the user, the amount of surface area of the conductive layer 10 the actuator base pushed into contact with the contact pad increases more rapidly at lower forces than at higher forces. There is therefore a greater increase in the current for a specific increase in force at a lower force relative to the increasing current for the same specific increase in force at a high force.

As a further demonstration of this, the convex dome shape of the actuator base 18 also provides lower precision at higher forces. This is due to the increase in the incline gradient of the actuator base towards the outer perimeter of the base. Lower precision is beneficial at this point due to the size of the force being applied by a user and the upper range of the force detectable by the button.

As a comparison to prior art systems, such as the Novation Launchpad Pro available before October 2019, prior art buttons were typically able to detect a minimum force of about 80 gram-force (gf), and had a force detection range between about 80 gf and 200 gf. However, the triggering force (i.e. the minimum force detectable) could range from about 80 gf to about 160 gf between different buttons. Using a button according to an aspect described herein, such as those in described in relation to FIGS. 2, 3, 4*b*, 5*b* and 6*b*, the minimum force detectable is about 50 gf to 60 gf, with a maximum force detectable being at least 200 gf, such as up to about 2000 gf or up to about 4000 gf. We have also found that the reliability between different buttons is improved to limit the minimum force detectable to between the range given above of 50 gf to 60 gf.

When in use, in order to push the conductive layer 10 into contact with the contact pad 4 and to increase the surface area of the conductive layer in contact with the contact pad as the force like to the button increases, the actuator 14 deforms so that the convex dome shape of the actuator base 18 flattens and conforms to the shape needed to push the substrate layer 8 with the conductive layer and the contact pad. This movement of the actuator also causes the reflex structure 16 to deform to allow the movement of the actuator.

When the user chooses to reduce the amount of force being applied to the actuator 14, the deformation of the actuator is reversed, which returns the actuator towards its natural shape when not in use. If the user only partially releases the force and the actuator, the deformation only reduces as much as the reduction in the force applied allows. Should the user release all force on the actuator, the actuator returns to its non-deformed state. The reflex structure 16 also urges the actuator away from the contact pad to return to its resting position were not in use. This urging may also be assisted in some examples by tension in the substrate layer 8 urging the substrate layer to return to an un-deformed shape as well. This urging by the reflex structure causes the actuator to have a resting position where it is held the position that does not cause the actuator or the substrate layer to deform.

The button 1 and button array 50 according to the aspects described herein, such as those described in relation to FIGS. 2, 3, 4*b*, 5*b* and 6*b*, may be used as part of a controller. One use of this controller is to make components connected to the controller produce sound. An alternative use of the button and button array to the aspects described herein could be in computer keyboards, for example where multiple button combinations are required to achieve a particular effect could be replaced by a user pressing a single button with the action that button press results in being dependent on the amount of force applied by the user to the button. Also, the button and button array according to the aspects described herein could be used to detect typing errors on a keyboard, such as when a key is pressed accidentally, which would typically result in a lighter button press than normal. Such a lighter button press would be detectable using said button and button array.

The invention claimed is:

1. A button for varying output based on force applied, the button comprising:

a contact pad with at least two contacts, the at least two contacts being arranged in a complementary pattern of interdigitated fingers with a first separation therebetween;

an actuator and a conductive layer, the conductive layer being located between a base of the actuator and the contact pad and being independent of the actuator and contact pad, the base of the actuator being shaped to increase the surface area of the conductive layer in contact with the at least two contacts as the actuator is pushed towards the contact pad, thereby increasing current flow between the at least two contacts in use as a force applied to the actuator increases;

wherein a shape and projections of each interdigitated finger form a continuous curve;

wherein a longitudinal axis of each of the fingers of the contacts is radially orientated; and wherein, at a radial center of the base of the actuator, there is a coaxial aperture in each of the contact pad, the conductive layer, and the base of the actuator.

2. The button according to claim 1, wherein at least a portion of the actuator is deformable, the at least a portion including the base of the actuator, the at least a portion being arranged to deform as force is applied to the actuator by a user and the conductive layer is in contact with the contact pad.

3. The button according to claim 2, wherein the base of the actuator, when in a non-deformed state, has a cross-sectional profile having at least one portion proximal to the contact pad and at least one portion distal to the contact pad and having an incline therebetween.

4. The button according to claim 3, wherein the at least one portion proximal to the contact pad is radially inward of the at least one portion distal to the contact pad.

5. The button according to claim 1, wherein the base of the actuator is circular.

6. The button according to claim 1, wherein the fingers each have one or more projections extending laterally to the longitudinal axis of the respective one of the fingers.

7. The button according to claim 1, wherein each of the fingers has a plurality of projections extending laterally to the longitudinal axis of the respective one of the fingers, the plurality of projections being radially spaced along the longitudinal axis of each respective one of the fingers.

8. The button according to claim 5, wherein the base of the actuator is circular and the at least two contacts includes a first contact and a second contact, each contacts having fingers interdigitated with fingers of the other of the first and second contact, the fingers of the first contact being connected to a circuit at an outer perimeter of the contact pad and the fingers of the second contact being connected to a circuit at an inner perimeter of the contact pad.

9. The button according to claim 1, wherein the first separation between the interdigitated fingers is curved, and the curve is a continuous curve.

10. The button according to claim 1, wherein the first separation between the interdigitated fingers is the same width along an entire length of each of the first separations.

11. The button according to claim 1, wherein each of the at least two contacts of the contact pad has a carbon ink coating, the contact between the conductive layer and the at least two contacts being provided by contact between the conductive layer and the carbon ink coating.

12. The button according to claim 1, wherein the conductive layer is suspended between the actuator and the contact pad.

13. The button according to claim 1, wherein the conductive layer is attached to a substrate, the substrate being supported radially outward of the contact pad.

14. The button according to claim 1, wherein the actuator is connected to a support, the support being arranged in use to urge the actuator away from the contact pad.

15. The button according to claim 14, wherein the support comprises a reflex structure and a holder, the reflex structure being connected to the actuator and the holder and being resiliently deformable, thereby providing the urging of the actuator in use.

16. The button according to claim 14, wherein the conductive layer is attached to a substrate, the substrate being supported radially outward of the contact pad and wherein the support to which the actuator is connected is supported by the substrate to which the contact pad is attached.

17. The button according to claim 14, further comprising a cover arranged in use to provide an outer casing for the button, the cover having an aperture providing access to the actuator.

18. A button array, the button array comprising a plurality of buttons according to claim 1.

19. The button according to claim 1, wherein when there is an absence of a user applied force there is a separation between the conductive layer and the contact pad.

* * * * *